United States Patent

Ohrn

[11] Patent Number: 6,000,438
[45] Date of Patent: Dec. 14, 1999

[54] PHASE CHANGE INSULATION FOR SUBSEA FLOWLINES

[75] Inventor: Theodore R. Ohrn, Stark City, Ohio

[73] Assignee: McDermott Technology, Inc., New Orleans, La.

[21] Appl. No.: 09/023,733

[22] Filed: Feb. 13, 1998

[51] Int. Cl.[6] ..................... F16L 9/22
[52] U.S. Cl. .......... 138/149; 138/155; 138/178
[58] Field of Search ................ 138/149, 155, 138/142, 178

[56] References Cited

U.S. PATENT DOCUMENTS

| | | | |
|---|---|---|---|
| Re. 23,545 | 9/1952 | Bond | 138/65 |
| 2,963,045 | 12/1960 | Canevari et al. | 138/68 |
| 3,151,633 | 10/1964 | Shuman | 138/177 |
| 3,480,493 | 11/1969 | Bauer et al. | 138/149 |
| 3,543,804 | 12/1970 | Ziegler | 138/105 |
| 3,626,987 | 12/1971 | Bittner | 138/114 |
| 4,000,760 | 1/1977 | Heller, Jr. et al. | 138/141 |
| 4,028,785 | 6/1977 | Jackson et al. | 29/157.3 R |
| 4,104,171 | 8/1978 | Stechmeyer | 252/8.3 |
| 4,162,093 | 7/1979 | Sigmund | 138/149 |
| 4,287,245 | 9/1981 | Kikuchi | 428/36 |
| 4,294,078 | 10/1981 | MacCracken | 62/59 |
| 4,346,739 | 8/1982 | Asada | 138/143 |
| 4,348,243 | 9/1982 | Craubner | 138/149 |
| 4,367,768 | 1/1983 | Schulke | 137/527.6 |
| 4,403,645 | 9/1983 | MacCracken | 165/10 |
| 4,421,661 | 12/1983 | Claar et al. | 252/70 |
| 4,512,388 | 4/1985 | Claar et al. | 165/1 |
| 4,606,378 | 8/1986 | Meyer | 138/103 |
| 4,798,769 | 1/1989 | Hayashi et al. | 428/460 |
| 4,824,705 | 4/1989 | Persson et al. | 428/35.9 |
| 4,995,427 | 2/1991 | Berchem | 138/155 |
| 5,307,842 | 5/1994 | Lequeux | 138/149 |
| 5,380,571 | 1/1995 | Ozawa et al. | 428/36.9 |
| 5,390,705 | 2/1995 | Brunnhofer | 138/137 |
| 5,458,441 | 10/1995 | Barry | 405/170 |
| 5,476,343 | 12/1995 | Sumner | 405/157 |
| 5,525,155 | 6/1996 | Allen | 106/802 |
| 5,654,060 | 8/1997 | Holman et al. | 428/68 |

FOREIGN PATENT DOCUMENTS

WO 87/04768   8/1987   WIPO .

OTHER PUBLICATIONS

Excerpt from an internal, proprietary, McDermott Technology, Inc. Report dated Jul. 24, 1997 comprising an Appendix of Vendor Supplied Information provided via personal communications to inventor Ohrn from Frisby Technologies and UDRI–Phase Change Laboratories, pp. 16–63.

*Primary Examiner*—Andres Kashnikow
*Assistant Examiner*—James F. Hook
*Attorney, Agent, or Firm*—R. J. Edwards; Eric Marich

[57] ABSTRACT

A subsea flowline or pipeline with passive insulation having improved transient heat-loss characteristics. The flowline or pipeline has a phase change material insulating the flowline pipe joints and/or pipe sections to greatly extend the cooldown time of produced or processed hydrocarbon fluid mixtures being transported therethrough during shut-in conditions. The phase change material surrounds a carrier pipe of the flowline or pipeline. The phase change material may be either dispersed or encapsulated within standard insulation. Additional insulation and/or a jacket pipe surrounds the phase change material and holds it against the carrier pipe. The phase change material can be of a micro-encapsulated or bulk-encapsulated type.

26 Claims, 3 Drawing Sheets

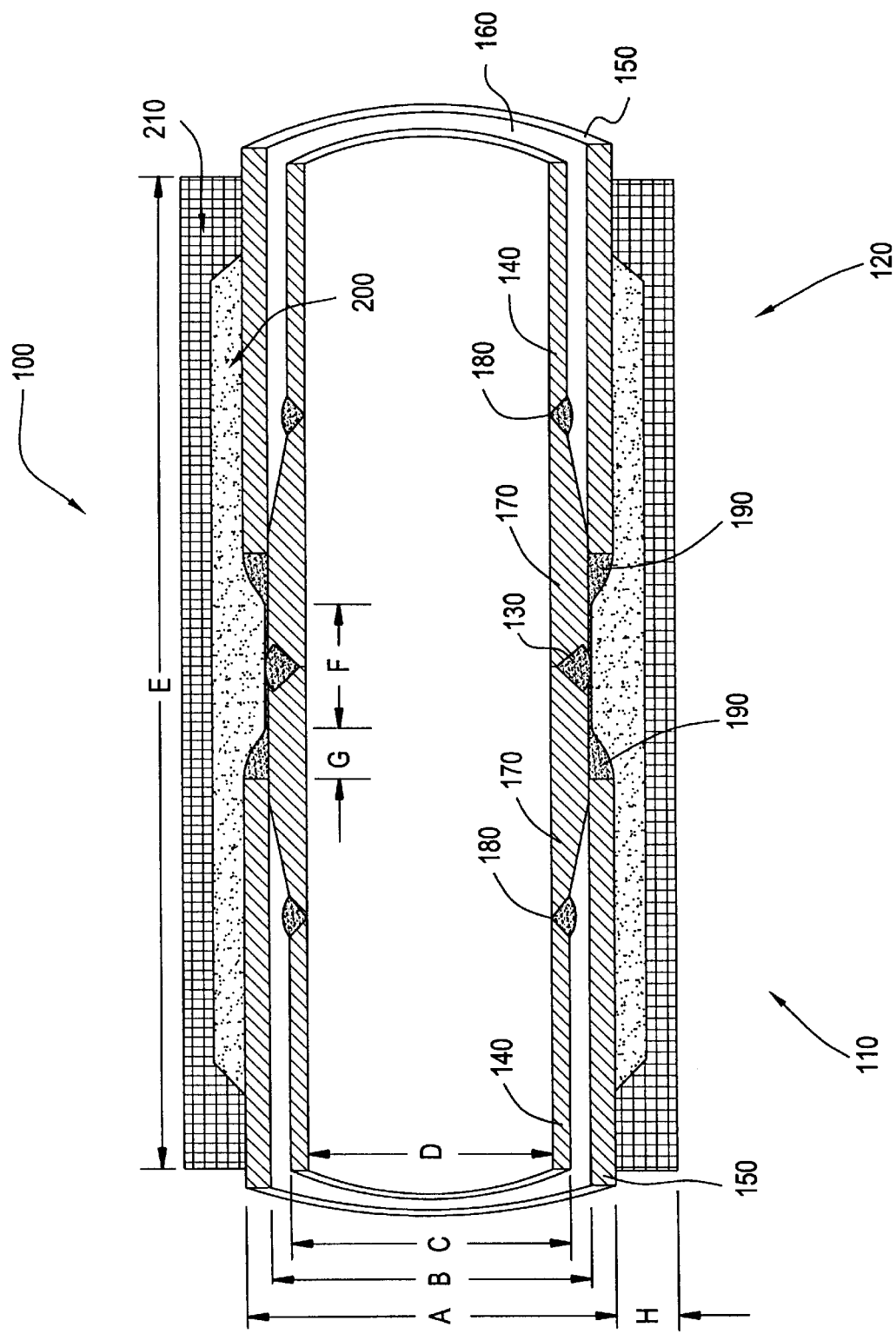

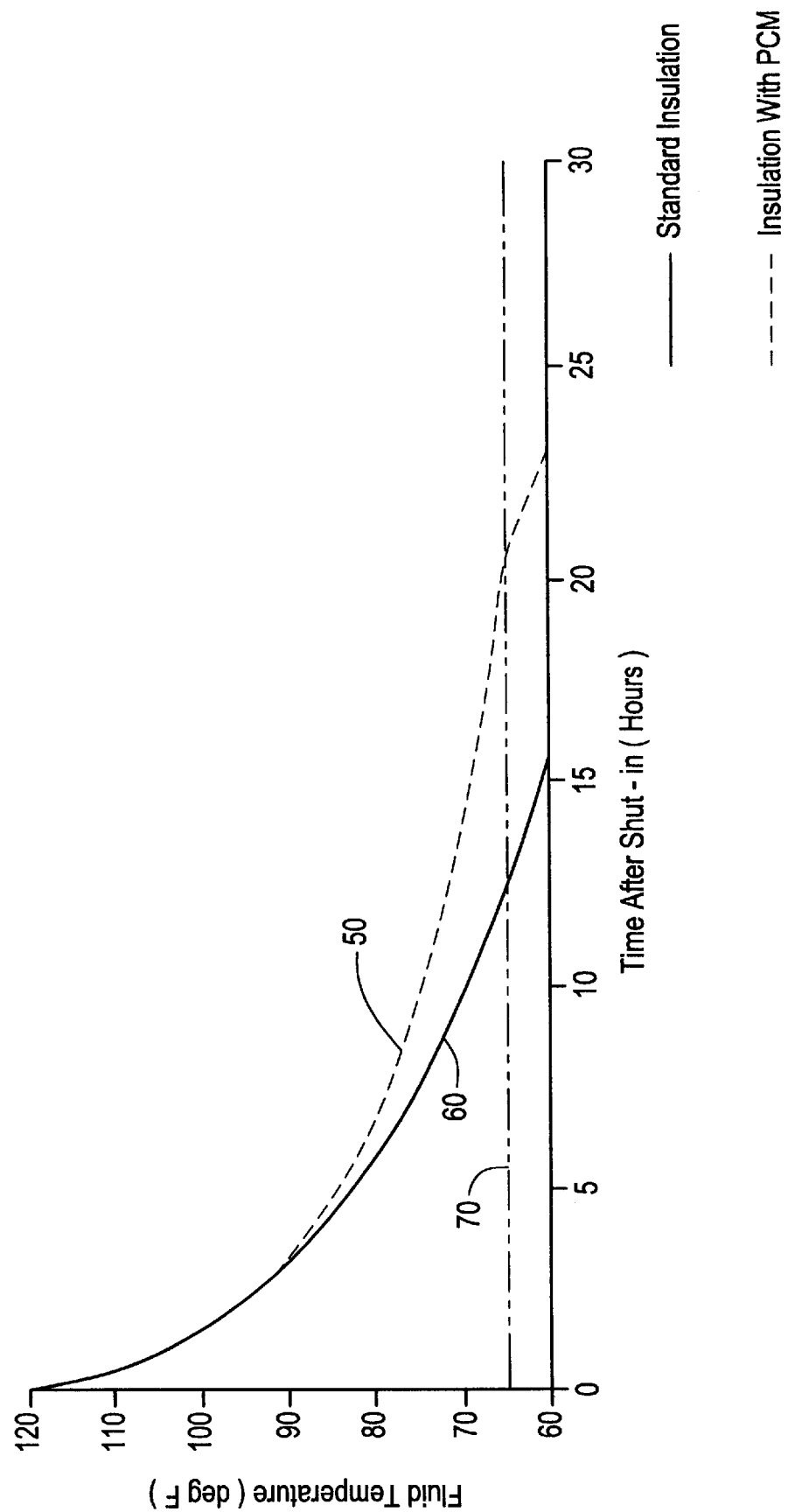

PHASE CHANGE INSULATION FOR SUBSEA FLOWLINES

FIELD OF THE INVENTION

The present invention relates generally to the field of subsea pipelines or flowlines for conveying produced or processed hydrocarbon fluid mixtures and, in particular, to a new and improved thermal insulation construction for such flowlines which employs phase change materials (PCMs) either alone or in combination with other conventional insulation materials to prevent blockages from forming due to cooling during shut-in periods. While the present invention is suitable for use as an improved thermal insulation anywhere along the length of such subsea flowlines, it is particularly suited for use as an improved thermal insulation construction at the joints between interconnected lengths of pipe-in-pipe subsea flowlines.

BACKGROUND OF THE INVENTION

Subsea flowlines are used to transport fluids produced at offshore gas/oil wells to a production platform located some distance (offset) away from the wells. The flowlines typically contain a mixture of oil, natural gas, and water. The mixture is at a relatively warm temperature when it is first extracted from the subterranean reservoir, but it cools as it moves through the flowline from the wells to the production platform. Indeed, the cooling rate becomes quite rapid if the production flow stops, and this occurrence is termed in the industry as "shut-in."

If the mixture cools too much, two transformations can occur. Hydrates can begin to form at sufficiently low temperatures when natural gas and water combine into an ice-like structure. Wax deposition on the flowline walls begins when the flowline pipe walls cool below the cloud point of the oil.

To combat these problems, some subsea flowlines have been insulated to minimize steady-state heat loss through the pipe walls while fossil fuel mixtures are flowing through them as well as when the flow has been stopped (i.e., the shut-in condition). There are several commercially available insulation materials for application to subsea flowlines used to transport such fluid mixtures from offshore gas/oil wells. These available insulation schemes include both non-jacketed and pipe-in-pipe designs.

Non-jacketed insulations are coated directly on the exterior of a pipe. Pipe-in-pipe insulation systems have an insulating medium contained within an annular region between an inner pipe (the fluid carrier) and an outer pipe (the jacket). Conventional insulation used as the insulating medium prolongs the cooling time for the pipe contents during a shut-in condition by both reducing the heat loss rate to the ambient seawater and by providing some additional sensible thermal storage capacity. However, the sensible heat storage capacity of conventional insulation is not very large.

The joints between pipe-in-pipe flowline sections are particularly susceptible to releasing heat from the flowline contents during shut-in conditions. During flowing conditions, the joints represent a small fraction of the total surface that the flowline contents contact. However, during shut-in conditions, the fluid mixture of components adjacent the joint cool much faster than those in the rest of the flowline pipe.

Several methods and apparatus have been applied to pipelines to reduce the problems associated with cooling of the flowline mixture. These include passive insulation schemes, as discussed above, active heating approaches which use electrical or other heating mechanisms, and the use of chemical inhibitors to lower the melting points of the mixture components or otherwise prevent them from forming blockages. Active heating and chemical inhibitors have been successfully used to prevent wax and hydrate formation in both flowing and shut-in conditions. Passive insulators, however, do not adequately extend the time before waxes and hydrates form in cases where ambient conditions are very cold or normal operating temperatures are not far above critical temperatures.

Phase change materials have been studied for many years, with research reaching a peak in the 1970's and 1980's. It is well known that all materials exhibit phase changes in their physical form as they pass from solid to liquid, and from liquid to gas, as heat energy is added. At their phase change temperatures, all materials absorb (or release) energy while remaining at a relatively constant temperature. The heat energy absorbed or released during phase changes is called the latent heat of the material. The latent heat can be used as a thermal energy storage for maintaining a warm or cool temperature in the region adjacent the phase change material.

SUMMARY OF THE INVENTION

It is an object of the present invention to provide an improved passive insulation for subsea flowlines used to transport produced or processed hydrocarbon fluid mixtures. While the present invention is suitable for use as an improved thermal insulation anywhere along the length of such subsea flowlines, it is particularly suited for use as an improved thermal insulation construction at the joints between interconnected lengths of pipe-in-pipe subsea flowlines to help prevent wax and hydrate formation in the flowline.

Accordingly, a phase change material is used to insulate flowline pipe joints, pipe sections, or extended portions of flowlines which convey produced or processed hydrocarbon fluid mixtures to greatly extend the cooldown time of the mixture being transported through the flowline during shut-in conditions. The phase change material surrounds a carrier pipe of the flowline pipe joint, pipe section, or flowline. The phase change material may be either dispersed within or encapsulated by standard insulation. Additional insulation and/or a jacket pipe surrounds the phase change material and holds it against the carrier pipe. The phase change material can be of a micro-encapsulated type; alternatively, a bulk-encapsulation approach can be employed.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

BRIEF DESCRIPTION OF THE DRAWINGS

In the drawings:

FIG. 3 is a sectional side view of a pipeline joint section joining two sections of flowline pipe insulated according to a third embodiment of the invention; and FIG. 4 is a graph plotting the joint cooldown profile temperature of a pipeline joint section joining two sections of flowline pipe, in degrees Fahrenheit against time in hours, which compares temperature loss through a conventionally insulated pipeline joint section against a pipeline joint section flowline insulated according to the invention (i.e., according to the embodiment of FIG. 3, supra).

DESCRIPTION OF THE PREFERRED EMBODIMENTS

Figure 1:
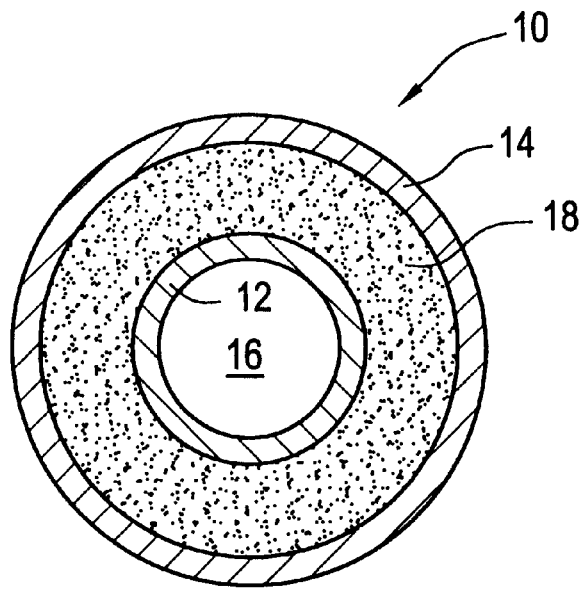
FIG. 1 is a cross-sectional end view of a section of flowline pipe insulated according to a first embodiment of the invention.

Referring now to the drawings, in which like reference numerals are used to refer to the same or functionally similar elements, FIG. 1 shows a cross-section of a flowline pipe 10 of the pipe-in-pipe type having a carrier pipe 12 surrounded by jacket pipe 14. Carrier pipe 12 is used to transport a produced or processed hydrocarbon fluid mixture 16, typically comprising a mixture of oil, natural gas, and water in varying amounts depending on the wellhead fluid reservoir's characteristics. Insulation 18, preferably in the form of micro-encapsulated phase change material (PCM) dispersed within conventional insulation material, fills an annular region between the inner carrier pipe 12 and the outer jacket pipe 14.

A solid sleeve of PCM material would achieve the desired effect and could be produced, for example, by a bulk-encapsulation approach. In a bulk-encapsulation approach, the PCM material would be heated to a temperature above its transition temperature and then poured into the annular region between the carrier pipe 12 and the jacket pipe 14.

It may, however, be desired to use a design which does not use the jacket pipe 14, in which case producing a solid sleeve of PCM may not be practical. Accordingly, the present invention also contemplates use of micro-encapsulated PCM dispersed within conventional insulation material. Typically, conventional pipe joint insulation material is cast around a pipe joint using a mold which is removed once the material cures. In actual practice, this dispersion could thus be accomplished by blending the PCM into or along with conventional pipe joint insulation material, and then casting it around a flowline pipe as described. The blending of the PCM material in with the conventional insulation material during such a process should not prove to be difficult.

There is one shortcoming with a dispersed PCM approach, and that involves the fact that the portion of the PCM dispersed within the outer portions of the sleeve or layer may never reach a temperature above the transition temperature of the PCM. That means that the outer most portions of the PCM would not come into use as an energy storage mechanism via phase change. A more efficient use of the PCM material would thus ensure that it is primarily employed in those regions where it is certain to experience temperatures in excess of its transition temperature, thus changing its phase and storing energy as latent heat until it is required.

Figure 2:
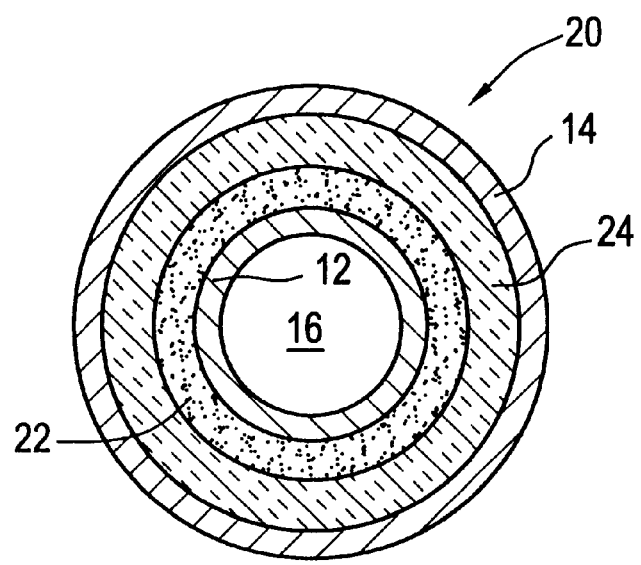
FIG. 2 is a cross-sectional end view of a section of flowline pipe insulated according to a second embodiment of the invention.

One simple way to accomplish this goal is to employ an inner layer or core of PCM material which is placed nearest to the produced or processed hydrocarbon fluid mixture 16 (i.e., on the side of the inner carrier pipe 12 directly opposite produced or processed hydrocarbon fluid mixture 16) which is then surrounded by an outer layer of standard or conventional insulation material. FIG. 2 shows such an alternate configuration for a flowline pipe, generally designated 20, in which a discrete layer of micro-encapsulated phase change material (PCM) 22 is placed around the carrier pipe 12 and then surrounded by an outer layer of conventional pipeline insulation 24. This approach takes full advantage of the phase change properties of the PCM and the better insulating properties of the insulation material. The thickness of the discrete layer 22 might be made a little thicker than necessary to ensure that the critical temperature regions are included. While both of the embodiments of FIGS. 1 and 2 disclose a jacket pipe 14, either encasing the insulation 18 having the micro-encapsulated PCM disposed therein (FIG. 1), as well as the embodiment wherein a layer of conventional insulation 24 surrounds the discrete layer of micro-encapsulated PCM, it will be understood that the jacket pipe 14 may be optional in either embodiment of the flowline pipe 10 or 20 according to the present invention.

For optimum performance, a PCM should be selected with a transition temperature as close as possible to the critical temperature of the produced or processed hydrocarbon fluid mixture 16 (that is, the temperature at which wax or hydrates begin to form) so that the maximum benefit of the PCM is obtained. In addition, the smaller the difference between the PCM transition temperature and the ambient temperature, the more effective the PCM is to extend the cool down time. The slower the heat loss rate, the longer the stored energy lasts.

In each of the embodiments shown in FIGS. 1 and 2, the phase change material (PCM) is preferably a micro-encapsulated type, such as that made by Frisby Technologies or Phase Change Laboratories. These phase change materials are paraffin type and have operating temperatures of between 22–143° F. and –30–220° F., respectively. They are available in a dry powder form. Phase change materials available from these two companies include N-Octadecane, N-Heptadecane, N-Hexadecane and pure Hexadecane. These are all examples of what may generally be referred to as paraffinic hydrocarbons.

Another line of phase change materials which must be separately encapsulated are available from Shape Energy Resources. These phase change materials include salt hydrate and paraffin based materials and have operating temperatures of between 32–243° F.

Other types of PCMs which are contemplated for use in the present invention include: alkyl hydrocarbon/silica dry powders; salt-hydrates; and polyethylene glycol.

Conventional insulations known to those skilled in the art and which may be used in the present invention include: AQUATHERM, a trademarked material made from resin or thermoplastic available from DynaMonitoring, Incorporated, of Houston, Tex.; polypropylene foam; syntactic foam; solid polyurethene; and polyurethane foam material.

FIG. 3 illustrates a third embodiment of the present invention, particularly drawn to a thermally insulated pipe joint, generally designated 100, for joining together two sections of a pipe-in-pipe flowline. Two sections of flowline pipe are shown being joined together by joint 100, and these two flowline pipe sections may be conventionally insulated according to the well-known approaches described above, or they may be insulated flowline pipes manufactured according to the embodiments of FIGS. 1 and 2 (i.e., flowline pipes 10 or 20).

The thermally insulated pipe joint 100 illustrated in FIG. 3 joins two flowline pipe sections generally designated 110 and 120, connected together by a circumferential weld 130. Each pipe section 110, 120 is comprised of an inner carrier pipe 140 surrounded by an outer jacket pipe 150. An annular region 160 is defined between inner carrier pipe 140 and outer jacket pipe 150, and this region 160 may be filled with insulation material or evacuated for the same purpose. The ends of each pipe section 110, 120 are provided with a specially prepared end portion 170 which is welded at one end to the inner carrier pipe 140. The other end is welded at circumferential weld 130 to fluidically interconnect the two pipe sections 110, 120. The outer jacket pipe 150 of each pipe section 110, 120 is also welded to the end portion 170 at 190. Surrounding the central portion of the thermally insulated pipe joint 100, and on the outside surface of the outer jacket pipe 150 is a layer of PCM 200 which, in turn, is surrounded by an outer layer of conventional insulation 210. The outer insulation layer 210 extends along the axial length of the pipe sections 110, 120 beyond the extremities of the PCM insulation 200. The letter designations in FIG. 3 denote dimensions of the analyzed pipe joint 100 configuration, and are set forth in Table 1 below:

TABLE 1

| Item | Dimension (in.) | Description |
| --- | --- | --- |
| A | 8.63 | jacket pipe outer diameter |
| B | 7.51 | jacket pipe inside diameter |
| C | 7.00 | carrier pipe outside diameter |
| D | 6.00 | carrier pipe inside diameter |
| E | 48–72 | total length of the insulation sleeve |
| F | 2.0 | stub length between welds (as analyzed) |
| G | 1.25 | weld length |
| H | 1–3 | insulation thickness |

It will be appreciated, of course, that the principles of the present invention can be readily applied to other pipe or pipe-in-pipe arrangements of different diameters than the one example set forth above. The main parameters which would vary as the invention is applied to different diameter pipe or flowline cases involves the insulation thickness H, and the required length E of the insulation "sleeve" 210. The required length E of the insulation sleeve 210 around the pipe joint 100 is related to the thickness H of the insulation and can be determined using standard heat transfer techniques. Considering the outer jacket pipe 150 wall as an insulated fin connected at the tip to an infinite fin, the optimum length E of the insulation sleeve 210 can be found by iterating the length of the insulation sleeve 210 until a minimum heat loss is achieved. For the case examined and studied, the following approximate length to thickness ratios were determined:

Insulation thickness H=1"thick; E=48"

Insulation thickness H=2"thick; E=60"

Insulation thickness H=3"thick; E=72".

Similar analyses could be performed for different diameter pipelines or flowlines. In addition, the thickness and length of the inner layer of PCM 200 is determined through 2-dimensional heat transfer analysis techniques. To ensure that the PCM 200 is used as efficiently as possible, the PCM 200 is preferably located primarily in regions which will reach temperatures above the transition temperature of the PCM 200 during steady-state operation.

Typically, the produced or processed hydrocarbon fluid mixtures 16 as extracted from subsea subterranean reservoirs are at temperatures of 120° F. or greater. Hydrate formation temperature is pressure dependent. At about 1800 psi, for example, hydrates will form in a light hydrocarbon/water mixture at a temperature of 65° F. In deep waters, where insulation is required, the ambient sea water temperature can be as low as 40° F. or less.

FIG. 4 graphically illustrates a joint cooldown profile temperature of a pipeline joint section joining two pipe-in-pipe flowline sections, in degrees Fahrenheit against time in hours, which compares temperature loss through a conventionally insulated pipeline joint section (curve 60) against a pipeline joint section flowline insulated according to the invention (curve 50) - i.e., made generally according to the embodiment of FIG. 3, supra. The cooling characteristics of a flowline joint with standard subsea insulation is shown by curve 60. The insulation in the standard flowline was two inches thick and extended 30 inches in each direction from the flowline pipe joint, and the thermal conductivity of the insulation was 0.095 Btu/hr-ft-° F. The cooling characteristics of a flowline joint insulated according to the invention is shown by curve 50. The flowline according to the invention had the same thickness and length of insulation as the standard flowline joint, but a one inch thick layer of phase change material consisting of micro-encapsulated N-Hexadecane was included within the insulation sleeve against the carrier pipe.

As illustrated in FIG. 4, it can be readily seen that using phase change material (PCM) in the insulating layer around flowline pipe joints increases the time before the produced or processed hydrocarbon fluid mixture 16 in the carrier pipe 12 reaches the point where hydrates form (65° F.—line 70) during a shut-in condition. The initial temperature of the produced or processed hydrocarbon fluid mixture 16 in both pipes was 120° F. and the ambient seawater temperature was 40° F. As can be seen by comparison of the intersection points of curves 50 and 60 with line 70, the time for the produced or processed hydrocarbon fluid mixture 16 contained in the standard insulation flowline joint to reach hydrate formation temperature was 12 hours, while the flowline insulated according to the invention maintained the produced or processed hydrocarbon fluid mixture 16 temperature above 65° F. for about 20 hours, or 75% longer.

Other studies using PCM-T27 in one inch thicknesses surrounded by low-density foam in the annulus between a flowline jacket pipe and carrier pipe indicate that the cooldown times to hydrate formation temperatures may be extended by two or more times.

The primary advantages of the present invention are several. First, prolonged cooldown times are provided. Second, the PCM is a passive energy storage system; nothing is required to activate the system, provided that a steady-state temperature above the transition temperature of the fluid contents being conveyed through the flowlines has been previously achieved. Third, human operator intervention is not required for some minimum time after a shut-in, and no chemical injection or electrical power heating is required to prevent wax or hydrates. Finally, the present invention can be manufactured using similar techniques already in use for standard insulation designs for such flowlines.

These advantages provide: 1) increased flexibility for operators to perform planned maintenance operations with the assurance of continued production upon restart; 2) reduced use of chemical inhibitors during extended shut-ins; and 3) a longer window to make decisions during unplanned shut-ins.

While specific embodiments of the invention have been shown and described in detail to illustrate the application of the principles of the invention, it will be understood that the invention may be embodied otherwise without departing from such principles. For example, and as described above, the thermal energy storage concept according to the present invention may be used to insulate a pipe joint, a pipe section, or a portion of an extended flowline. Thus, it is equally applicable to flowlines and/or pipe joints for same which are assembled from relatively short, discrete pipe sections assembled together with pipe joints therebetween, as well as to flowlines which are made by known pipe reeling techniques where extremely long lengths of continuous pipe are un-reeled off of spools (on land or over water) to make the fowline with a reduced number of pipe joints therebetween. Thus the term flowline includes those flowlines made by shorter, interconnected pipe sections, as well as those flowlines made of longer, interconnected sections of pipe laid by pipe reeling or other similar methods, which are connected together. Certain features of the invention may thus be used without a corresponding use of other features, but all such variations and embodiments fall within the scope and equivalents of the following claims.

I claim:

1. A thermally insulated pipe joint for a flowline for subsea transport of a produced or processed hydrocarbon fluid mixture possessing a heat energy having improved transient heat-loss characteristics during a shut-in condition, the thermally insulated pipe joint comprising:

a pair of flowline pipe sections joined together at adjacent ends thereof to form a flowline path for the produced or processed hydrocarbon fluid mixture; and improved insulation comprising a phase change material means surrounding at least the joined together adjacent ends of the pair of flowline pipe sections for insulating and absorbing and releasing the heat energy of the fluid mixture at a temperature between approximately −30° F. and 243° F.

2. The thermally insulated pipe joint according to claim 1, wherein each of the flowline pipe sections comprises an inner carrier pipe surrounded by an outer jacket pipe which together define an annular region therebetween.

3. The thermally insulated pipe joint according to claim 2, wherein the annular region is provided with one of an insulating material and a vacuum.

4. The thermally insulated pipe joint according to claim 2, wherein the phase change material means surrounds the outer jacket pipe.

5. The thermally insulated pipe joint according to claim 2, wherein the flowline pipe section further comprises an end portion welded at one end to the inner carrier pipe and at the other end at a circumferential weld which joins together the adjacent ends of the flowline pipe sections.

6. The thermally insulated pipe joint according to claim 1, wherein the phase change material means comprises one of micro-encapsulated and bulk-encapsulated phase change material.

7. The thermally insulated pipe joint according to claim 1, wherein the phase change material means comprises micro-encapsulated phase change material dispersed within an insulation material.

8. The thermally insulated pipe joint according to claim 1, wherein the phase change material means comprises a discrete layer of phase change material surrounding the adjacent ends of the pair of flowline pipe sections and a layer of insulation material surrounding the discrete layer of phase change material.

9. The thermally insulated pipe joint according to claim 8, wherein the layer of insulation material surrounding the discrete layer of phase change material extends beyond the extremities of the latter.

10. The thermally insulated pipe joint according to claim 8, wherein the layer of insulation material surrounding the discrete layer of phase change material has an optimum length based upon the thickness of the insulation material.

11. The thermally insulated pipe joint according to claim 1, wherein the phase change material means comprises one of paraffinic hydrocarbons, alkyl hydrocarbon/silica dry powders, salt-hydrates, and polyethylene glycol.

12. The thermally insulated pipe joint according to claim 1, wherein the phase change material means is located primarily in regions which will reach temperatures above a transition temperature of the phase change material means during a steady-state operating condition of the flowline.

13. A thermally insulated pipe section having improved transient heat-loss characteristics, comprising:

an inner carrier pipe for transporting a fluid possessing a heat energy; and improved insulation comprising a phase change material means surrounding the inner carrier pipe for insulating and absorbing and releasing the heat energy of the fluid at a temperature between approximately −30° F. and 243° F.

14. The thermally insulated pipe section according to claim 13, further comprising an outer jacket pipe surrounding the phase change material means.

15. The thermally insulated pipe section according to claim 13, wherein the phase change material means comprises one of a micro-encapsulated and a bulk-encapsulated phase change material.

16. The thermally insulated pipe section according to claim 13, wherein the phase change material means comprises micro-encapsulated phase change material dispersed within an insulation material.

17. The thermally insulated pipe section according to claim 13, wherein the phase change material means comprises a discrete layer of phase change material surrounding the inner carrier pipe and a layer of insulation material surrounding the discrete layer of phase change material.

18. The thermally insulated pipe section according to claim 17, wherein the phase change material means is located primarily in regions which will reach temperatures above a transition temperature of the phase change material means during a steady-state operating condition of the thermally insulated pipe section.

19. The thermally insulated pipe section according to claim 13, wherein the phase change material means comprises one of paraffinic hydrocarbons, alkyl hydrocarbon/silica dry powders, salt-hydrates, and polyethylene glycol.

20. A thermally insulated flowline for subsea transport of a produced or processed hydrocarbon fluid mixture possessing a heat energy having improved transient heat-loss characteristics, comprising:

an inner carrier pipe for transporting the fluid mixture; and improved insulation comprising a phase change material means surrounding the inner carrier pipe, for insulating and absorbing and releasing the heat energy of the fluid mixture at a temperature between approximately −30° F. and 243° F.

21. The thermally insulated flowline according to claim 20, wherein the phase change material means comprises one of a micro-encapsulated and a bulk-encapsulated phase change material.

22. The thermally insulated flowline according to claim 20, wherein the phase change material means comprises micro-encapsulated phase change material dispersed within an insulation material.

23. The thermally insulated flowline according to claim 20, wherein the phase change material means comprises a discrete layer of phase change material surrounding the inner carrier pipe and a layer of insulation material surrounding the discrete layer of phase change material.

24. The thermally insulated flowline according to claim 23, wherein the phase change material means is located primarily in regions which will reach temperatures above a transition temperature of the phase change material means during a steady-state operating condition of the thermally insulated flowline.

25. The thermally insulated flowline according to claim 20, wherein the phase change material means comprises one of paraffinic hydrocarbons, alkyl hydrocarbon/silica dry powders, salt-hydrates, and polyethylene glycol.

26. The thermally insulated flowline according to claim 20, further comprising an outer jacket pipe surrounding the phase change material means.

* * * * *